United States Patent
Talasila et al.

(10) Patent No.: US 12,294,861 B2
(45) Date of Patent: May 6, 2025

(54) PHANTOM CALL REDUCTION FOR CELLULAR NETWORKS

(71) Applicant: AT&T Intellectual Property I, L.P., Atlanta, GA (US)

(72) Inventors: Manoop Talasila, Branchburg, NJ (US); Mukesh Mantan, Irving, TX (US); Anwar Syed Aftab, Budd Lake, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 450 days.

(21) Appl. No.: 17/819,011

(22) Filed: Aug. 11, 2022

(65) Prior Publication Data
US 2024/0056817 A1    Feb. 15, 2024

(51) Int. Cl.
*H04W 12/08* (2021.01)
*H04W 12/12* (2021.01)
*H04W 12/72* (2021.01)
*H04W 24/02* (2009.01)

(52) U.S. Cl.
CPC .......... *H04W 12/12* (2013.01); *H04W 12/08* (2013.01); *H04W 12/72* (2021.01); *H04W 24/02* (2013.01)

(58) Field of Classification Search
CPC ...... H04W 12/12; H04W 12/08; H04W 12/72
See application file for complete search history.

(56) References Cited

U.S. PATENT DOCUMENTS

| 11,622,317 B2* | 4/2023 | Jonnala ............. H04W 8/26 370/329 |
| 2007/0115941 A1* | 5/2007 | Patel ............... H04L 65/1101 370/352 |
| 2023/0305904 A1* | 9/2023 | Lowe ............... G06F 11/3414 |

OTHER PUBLICATIONS

Bassil et al., "Effects of Signaling Attacks on LTE Networks," WAINA '13: Proceedings of the 2013 27th International Conference on Advanced Information Networking and Applications Workshops, Mar. 2013, 6 pages.
Borgaonkar et al., "Security Analysis of a Femtocell Device," SIN '11: Proceedings of the 4th international conference on Security of information and networks, Nov. 2011, 8 pages.
Cao et al., "A Survey on Security Aspects for LTE and LTE-A Networks," IEEE Communications Surveys & Tutorials (vol. 16, Issue: 1, First Quarter 2014), Apr. 19, 2013, 20 pages.
Chernov et al., "Anomaly Detection Algorithms for the Sleeping Cell Detection in LTE Networks," 2015 IEEE 81st Vehicular Technology Conference (VTC Spring), 5 pages.

(Continued)

*Primary Examiner* — Michael T Vu
(74) *Attorney, Agent, or Firm* — Guntin & Gust, PLC; Robert Gingher

(57) ABSTRACT

The described technology is generally directed towards reducing unwanted cellular network activities, such as phantom 911 calls or other unwanted cellular network activities. Machine learning models described herein can be trained, using device level data and network level data, to identify devices that are likely to engage in an unwanted cellular network activity. A trained machine learning model can be deployed to identify devices, and devices identified by the trained machine learning model can be re-configured to prevent them from engaging in the unwanted cellular network activity. Devices likely to engage in the unwanted cellular network activity are thus identified and reconfigured (Continued)

to prevent future unwanted cellular network activity before it occurs.

20 Claims, 11 Drawing Sheets

(56) References Cited

OTHER PUBLICATIONS

Golde et al., "Weaponizing Femtocells: The Effect of Rogue Devices on Mobile Telecommunication," NDSS 2012, San Diego, Feb. 6, 2012, 16 pages.

Hancock et al., "Survey on categorical data for neural networks," Journal of Big Data 7(1), Apr. 2020, 42 pages.

Hussain et al., "Semi-Supervised Learning Based Big Data-Driven Anomaly Detection in Mobile Wireless Networks," China Communications, Apr. 2018, 17 pages.

Li et al., "Scaling Deep Learning Models for Spectrum Anomaly Detection," Mobihoc '19: Proceedings of the Twentieth ACM International Symposium on Mobile Ad Hoc Networking and Computing, Jul. 2019, 10 pages.

Mcginnis et al., "Category Encoders: a scikit-learn-contrib package of transformers for encoding categorical data," The Journal of Open Source Software 3 (Jan. 2018), 501, 2 pages.

Milne et al., "Strategies for Diagnosis," IEEE Transactions on Systems, Man, and Cybernetics, vol. SMC-17, No. 3, May/Jun. 1987, 7 pages.

Mirsky et al., "DDoS Attacks on 9-1-1 Emergency Services," IEEE Transactions on Dependable and Secure Computing ( vol. 18, Issue: 6, Nov.-Dec. 1, 2021), 18 pages.

Moysen et al., "Unsupervised learning for detection of mobility related anomalies in commercial LTE networks," 2020 European Conference on Networks and Communications (EuCNC): Radio Access and Softwarisation (RAS), 5 pages.

Myles et al., "An introduction to decision tree modeling," J. Chemometrics 2004; 18: 275-285, 11 pages.

Shah, "A Tutorial on LTE Evolved Utran (EUTRAN) and LTE Self Organizing Networks (SON)," Master's Thesis, The University of Texas at Arlington, Dec. 2010, 115 pages.

Shaik et al., "On the Impact of Rogue Base Stations in 4G/LTE Self Organizing Networks," WiSec '18: Proceedings of the 11th ACM Conference on Security & Privacy in Wireless and Mobile Networks, Jun. 2018, 12 pages.

Sun et al., "Enhancing Security Using Mobility-Based Anomaly Detection in Cellular Mobile Networks," IEEE Transactions on Vehicular Technology, vol. 55, No. 4, Jul. 2006, 12 pages.

Trinh et al., "Urban Anomaly Detection by processing Mobile Traffic Traces with LSTM Neural Networks," 2019 16th Annual IEEE Int. Conf. on Sensing, Communication, and Networking (SECON), IEEE, 1-8, 8 pages.

Yang, "An Evaluation of Statistical Approaches to Text Categorization," Information Retrieval, vol. 1, pp. 69-90 (1999), 22 pages.

Yang et al., "A re-examination of text categorization methods," SIGIR '99: Proceedings of the 22nd annual International ACM SIGIR conference on Research and development in information retrieval, Aug. 1999, 8 pages.

Hu et al., "A Machine Learning-Driven Analysis of Phantom E911 Calls," WiseML '22: Proceedings of the 2022 ACM Workshop on Wireless Security and Machine Learning; May 2022; 6 pages.

* cited by examiner

| Feature | Description | Type |
|---|---|---|
| IMSI | International Mobile Subscriber Identity: The unique identifier of a mobile device's SIM card. It is used to authenticate a user in the mobile network. | Device |
| IMEI | International Mobile Equipment Identity: A unique identifier of an individual mobile/UE. | Device |
| CELL_ID | Geographic area that communicates with an eNB, and identified by its "cell ID". | Network |
| PLMN_ID | Public Land Mobile Network Identifier: A unique identifier of a PLMN (a terrestrial wireless communication network). | Network |
| MMEGI | MME Group ID: Unique within a PLMN. When MME Pooling is utilised within an LTE network, the MMEGI uniquely identifies which group (pool) the MME is assigned to. | Network |
| MMEC | MME Code: Uniquely identifies an MME within a MME Group. | Network |
| MTMSI | MME Mobile Subscriber Identity: Assigned randomly but unique for every device within an MME. | Network |
| eNBId | Identification number of the eNodeB. | Network |

FIG. 5

GUTI 700

| PLMN_ID<br>(20-24 bits)<br>701 | MMEGI<br>(16 bits)<br>702 | MMEC<br>(8 bits)<br>703 | MTMSI<br>(32 bits)<br>704 |
|---|---|---|---|

FIG. 7

IMEI 800

| TAC Body Identifier<br>(2 digits)<br>801 | TAC Type Identifier<br>(6 digits)<br>802 | Serial Number<br>(6 digits)<br>803 | Check Digit<br>(1 digit)<br>804 |
|---|---|---|---|

FIG. 8

IMSI 900

| MCC<br>(2 digits)<br>901 | MNC<br>(2-3 digits)<br>902 | MSIN<br>(up to 10 digits)<br>903 |
|---|---|---|

FIG. 9

PHANTOM CALL REDUCTION FOR CELLULAR NETWORKS

TECHNICAL FIELD

The subject application is related to cellular communication networks, and more particularly, to reducing phantom calls to emergency services in advanced networks, such as fourth generation, fifth generation, and subsequent generation cellular communication networks.

BACKGROUND

Occasionally, devices connected to cellular networks engage in malicious, unnecessary, or otherwise unwanted network activities. Such network activities may be characterized as intentional or unintentional. One example of unwanted network activity is "phantom" enhanced 911 (E911) calls.

An average of 240 million 911 calls are made annually in the United States, 80% of which originate from wireless devices. E911 calls, which provide dispatchers with the caller's location, are especially important for public safety. Emergency services rely on such calls being routed from cellular devices to first responders in a timely manner. In recent years, telecommunication networks have been receiving high volumes of phantom E911 calls. Phantom calls are typically automatically generated two-second calls, placed often unbeknownst to the user. Phantom E911 calls are problematic as they pose a drag on cellular networks and take away from critical resources needed to respond to genuine calls and true emergencies.

It is unclear whether phantom E911 calls are a product of device configuration issues or are related to issues in the device operating system. Despite their high volume, the huge difference in data sample size between good calls versus phantom calls makes it challenging to classify them effectively. Additionally, mobile networks often contain mobile devices from third-party vendors; this adds further complexity to the network and makes the task of phantom call detection even more challenging. To this end, solutions are needed to address unwanted network activity phenomena, such as phantom E911 calls.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 is a table listing example device level features and network level features, and descriptions thereof, in accordance with various aspects and embodiments of the subject disclosure.

FIG. 7 illustrates example globally unique temporary identifier (GUTI) data, wherein sub-parts of the GUTI data can optionally be separately considered during machine learning model training, in accordance with various aspects and embodiments of the subject disclosure.

FIG. 8 illustrates example international mobile equipment identity (IMEI) data, wherein sub-parts of the IMEI data can optionally be separately considered during machine learning model training, in accordance with various aspects and embodiments of the subject disclosure.

FIG. 9 illustrates example international mobile subscriber identity (IMSI) data, wherein sub-parts of the IMSI data can optionally be separately considered during machine learning model training, in accordance with various aspects and embodiments of the subject disclosure.

DETAILED DESCRIPTION

Figure 1:
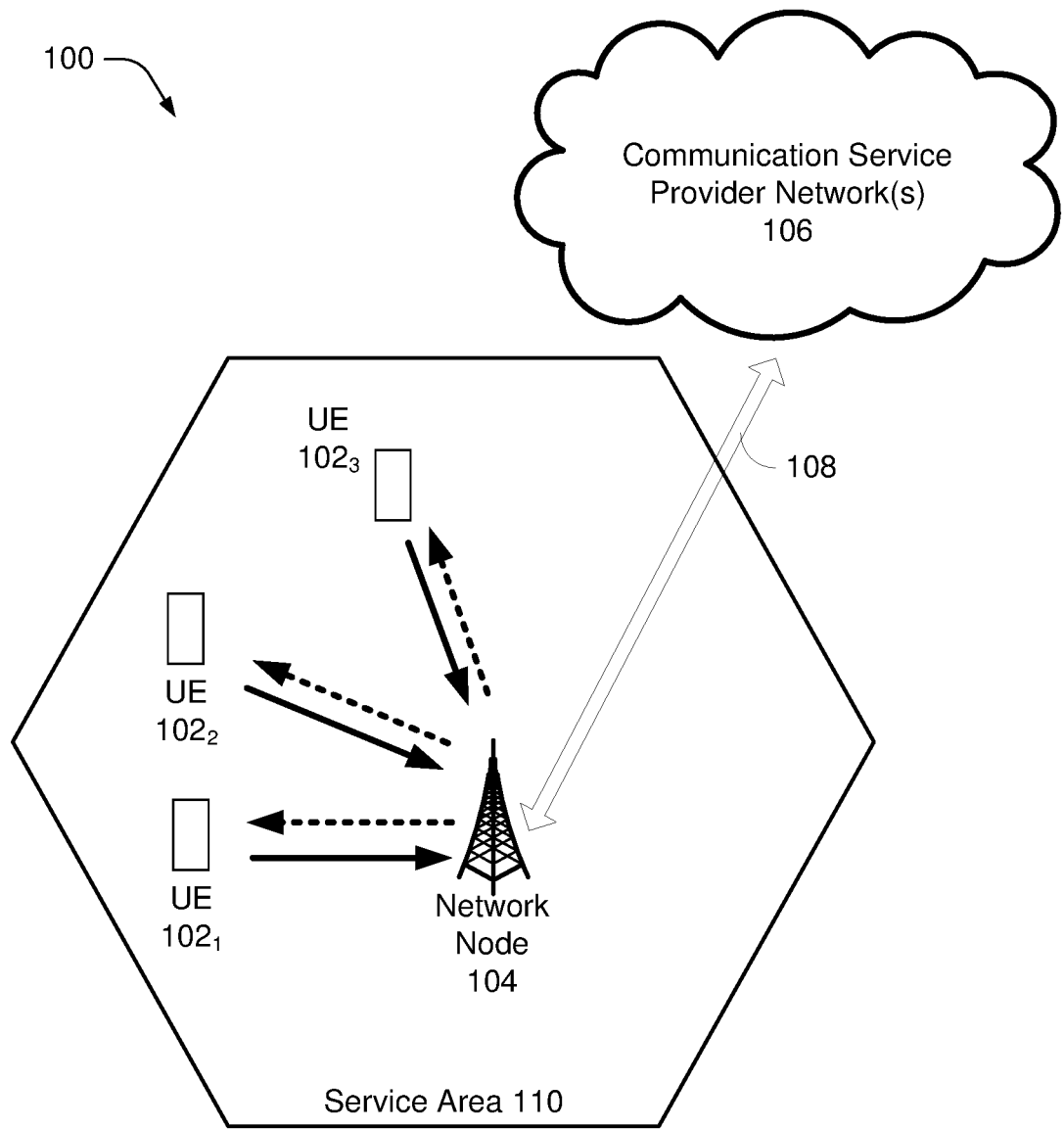
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards reducing unwanted cellular network activities, such as phantom 911 calls or other unwanted cellular network activities. Machine learning models described herein can be trained, using device level data and network level data, to identify devices that are likely to engage in an unwanted cellular network activity. A trained machine learning model can be deployed to identify devices, and devices identified by the trained machine learning model can be re-configured to prevent them from engaging in the unwanted cellular network activity. Devices likely to engage in the unwanted cellular network activity are thus identified and reconfigured to prevent future unwanted cellular network activity before it occurs. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, $102_3$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
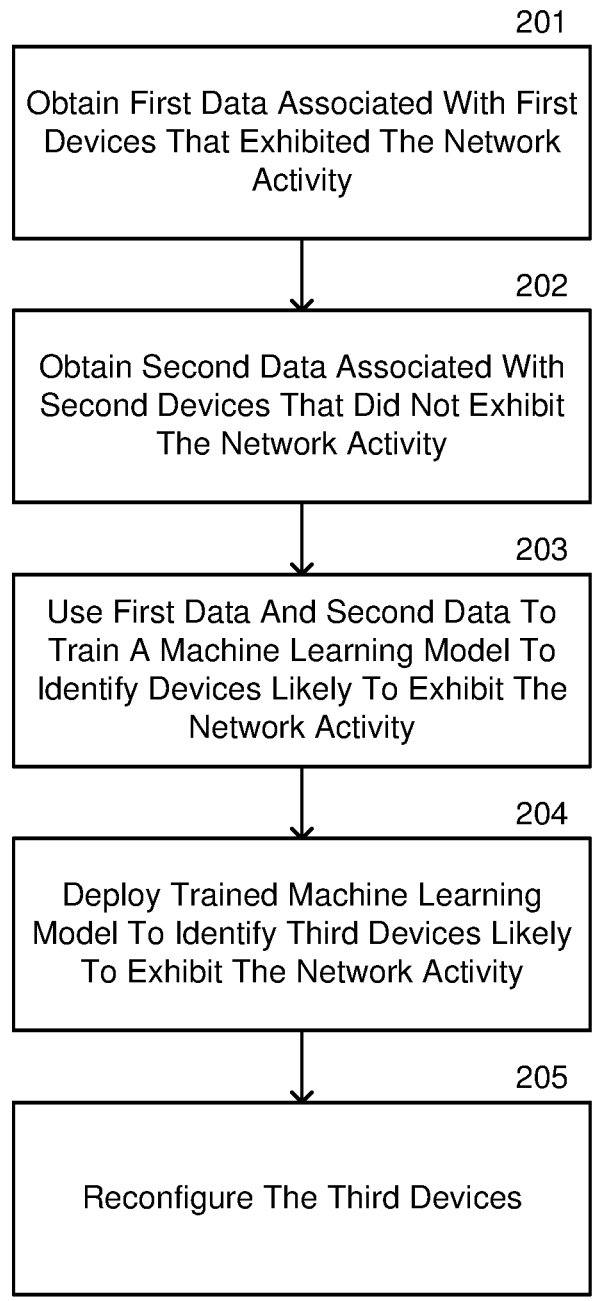
FIG. 2 illustrates example operations to train and deploy a machine learning model to prevent devices from engaging in a cellular network activity, in accordance with various aspects and embodiments of the subject disclosure.

FIG. 2 illustrates example operations to train and deploy a machine learning model to prevent devices from engaging in a cellular network activity, in accordance with various aspects and embodiments of the subject disclosure. FIG. 2 includes, "obtain first data associated with first devices that exhibited the network activity" 201, "obtain second data associated with second devices that did not exhibit the network activity" 202, "use first data and second data to train a machine learning model to identify devices likely to exhibit the network activity" 203, "deploy trained machine learning model to identify third devices likely to exhibit the network activity" 204, and "reconfigure the third devices" 205.

FIG. 2 provides an overview of operations that can be performed according to embodiments of this disclosure, and details regarding the operations 201-205 are further described herein. This disclosure will use phantom emergency calls as an example of the network activity referred to in FIG. 2, however, other network activities can also be prevented by applying the techniques described herein. One aspect of FIG. 2 is, the operations prevent devices from engaging in a network activity, such as phantom calls, rather than blocking or otherwise thwarting the network activity after it is attempted, e.g., blocking a phantom call after the call has been initiated by a device. The preventive nature of FIG. 2 is particularly advantageous for phantom calls, because legal requirements to process emergency calls can prevent blocking such calls after they are made, and therefore preventing phantom calls before they are made can be a more powerful solution.

In some embodiments, the operations illustrated in FIG. 1 can be performed by network equipment in communication service provider network(s) 106 such as illustrated in FIG. 1. Devices such as UEs 102 can engage in a wide variety of network activities, some of which may be unwanted, such as phantom calls. Unwanted network activities of UEs 102 can be prevented using the techniques illustrated in FIG. 2.

At operation 201, the first data can comprise device level data and/or network level data associated with first devices that exhibited the network activity, e.g., device level data and/or network level data associated with devices that made phantom calls. The device level data and/or network level data can be gathered from call detail records associated with known phantom calls and/or from other sources.

At operation 202, the second data can comprise device level data and/or network level data associated with second devices that did not exhibit the network activity. The device level data and/or network level data can be gathered from call detail records associated with known legitimate emergency calls, and/or from other sources. The data obtained via operations 201 and 202 can be anonymized, pre-processed, and encoded using techniques described herein, to prepare the data for use in connection with training machine learning models.

At operation 203, data obtained via operations 201 and 202 can be used to train one or more machine learning models to identify devices likely to exhibit the network activity, e.g., devices likely to make phantom calls. This disclosure provides two example machine learning model types. A first machine learning model type can be trained using device level data, to identify, based on device level data, the devices likely to exhibit the network activity. A second machine learning model type can be trained using network level data, to identify, based on network level data, the devices likely to exhibit the network activity. One or both disclosed machine learning model types can be used in embodiments of this disclosure.

At operation 204, the trained machine learning model(s), trained at operation 203, can be deployed to identify third devices likely to exhibit the network activity, e.g., likely to engage in phantom calls. The trained machine learning model(s) can be deployed by providing the trained machine learning model(s) with device and/or network level data, e.g., call detail records, associated with devices connected to a network. The device and/or network data can optionally be anonymized, pre-processed and encoded in a similar manner to the data that was used to train the machine learning model(s). The trained machine learning model(s) can use the device and/or network data to identify, from among the devices connected to the network, the "third" devices, namely the devices likely to exhibit phantom calls or other unwanted network activity, optionally before the third devices undertake the network activity.

At operation 205, the third devices identified pursuant to operation 204 can optionally be reconfigured to prevent the third devices from engaging in future phantom calls or other unwanted network activities. For example, device settings such as hardware, operating system, or software settings of a third device can be modified in a manner that prevents the third devices from engaging in the network activity. Network settings applicable to a third device can also optionally be modified in a manner that prevents the third device from engaging in the network activity. In some embodiments, a software update or software patch can be applied to a third device in order to prevent the third device from engaging in the unwanted network activity.

FIGS. 3-9 provide further details of example embodiments directed to phantom call detection and prevention, with the understanding that the disclosed techniques can be extended to prevention of other network activities. Phantom Enhanced 911 (E911) calls are typically automatically generated calls, and are a serious concern on cellular networks, and consume critical resources. As networks become increasingly complex, detecting and troubleshooting the causes of phantom E911 calls is becoming increasingly difficult. In this disclosure, machine learning (ML) tools are used to analyze anonymized call detail record data. The data can be carefully pre-processed and encoded using an efficient encoding method. Classification processes, such as K Nearest Neighbors (KNN) and Decision Trees (DTs), can be implemented to study correlations between device and network level features and a mobile device's ability to initiate phantom calls. This disclosure also suggests certain policy changes for network operators that may decrease the high volume of phantom E911 calls or alleviate the pressure of phantom E911 calls on a cellular network.

The phenomenon of phantom E911 calls and ways to detect them is a major issue of concern among network operators. The types of anomalies which have been studied are mainly network level anomalies such as sleeping cells or spectrum anomalies. However, investigation of anonymized call records data indicates that phantom calls are likely a consequence of device level anomalies (i.e. a mobile device "going rogue") among a particular cluster of devices. Additionally, anomalies can come from particular cell site(s) in a network, and network devices can be used to locate the anomalous devices.

The possible causes of phantom E911 calls can be of two types: 1) those related to devices and 2) those related to network properties. Embodiments of this disclosure can address device and network related features separately. To take the first step towards addressing phantom E911 calls, machine learning tools can be used to study anonymized data from call detail records containing various device IDs and network IDs. Device and network-related features that may increase the potential of a device to initiate phantom calls can be identified. One aim of this disclosure is therefore diagnostic in nature: machine learning-driven techniques are used to identify the possible triggers of phantom E911 calls.

In some embodiments, call record data can be carefully pre-processed, separated into device and network level features, and encoded. A KNN tool can be used to classify call record data, verifying that only a handful of device-level features have a strong correlation with a mobile's ability to initiate phantom E911 calls. A resulting fitted model can be generalizable and can work well even on new testing data. Furthermore, a DT tool can be used to classify call record data, verifying that only certain network level features are associated with E911 phantom calls.

Based on the teachings of this disclosure, network operator policies can be adapted to mitigate the problem of E911 phantom calls. The machine learning approaches disclosed herein were chosen due to their ease of implementation, interpretability and accuracy. Additionally, these machine learning approaches do not require any prior assumptions on the model, as other signal processing-based approaches may.

Throughout this disclosure, we refer to "rogue devices" as mobile devices that have initiated phantom E911 calls. We focus on LTE networks, as the majority of the present network calls are through 4G LTE and the phenomenon of phantom E911 calls has been prominently observed in such networks. However, the techniques disclosed herein can be applied in the context of 5G and subsequent generation networks as well.

Figure 3:
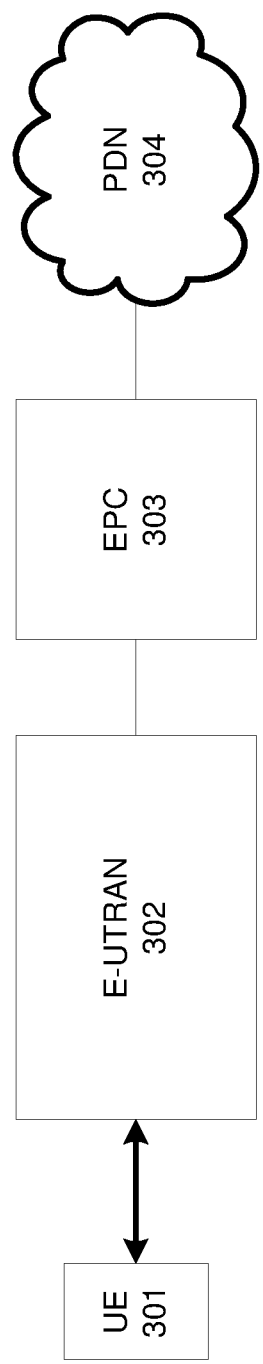
FIG. 3 is a high-level system view of an example long term evolution (LTE) network, in accordance with various aspects and embodiments of the subject disclosure.

FIG. 3 is a high-level system view of an example LTE network, in accordance with various aspects and embodiments of the subject disclosure. FIG. 3 includes a UE 301, an evolved universal mobile telecommunications service (UMTS) terrestrial radio access network (E-UTRAN) 302, an evolved packet core (EPC) 303, and a packet data network (PDN) 304. The E-UTRAN 302 controls all radio communications between the UE 301 and the EPC 303. The EPC 303 communicates with external networks, or the PDN 304, to provide services to the UE 301, such as the Internet or other operator services. The EPC 303 contains the core entities responsible for the functionality of the network, including management of voice and data calls.

Figure 4:
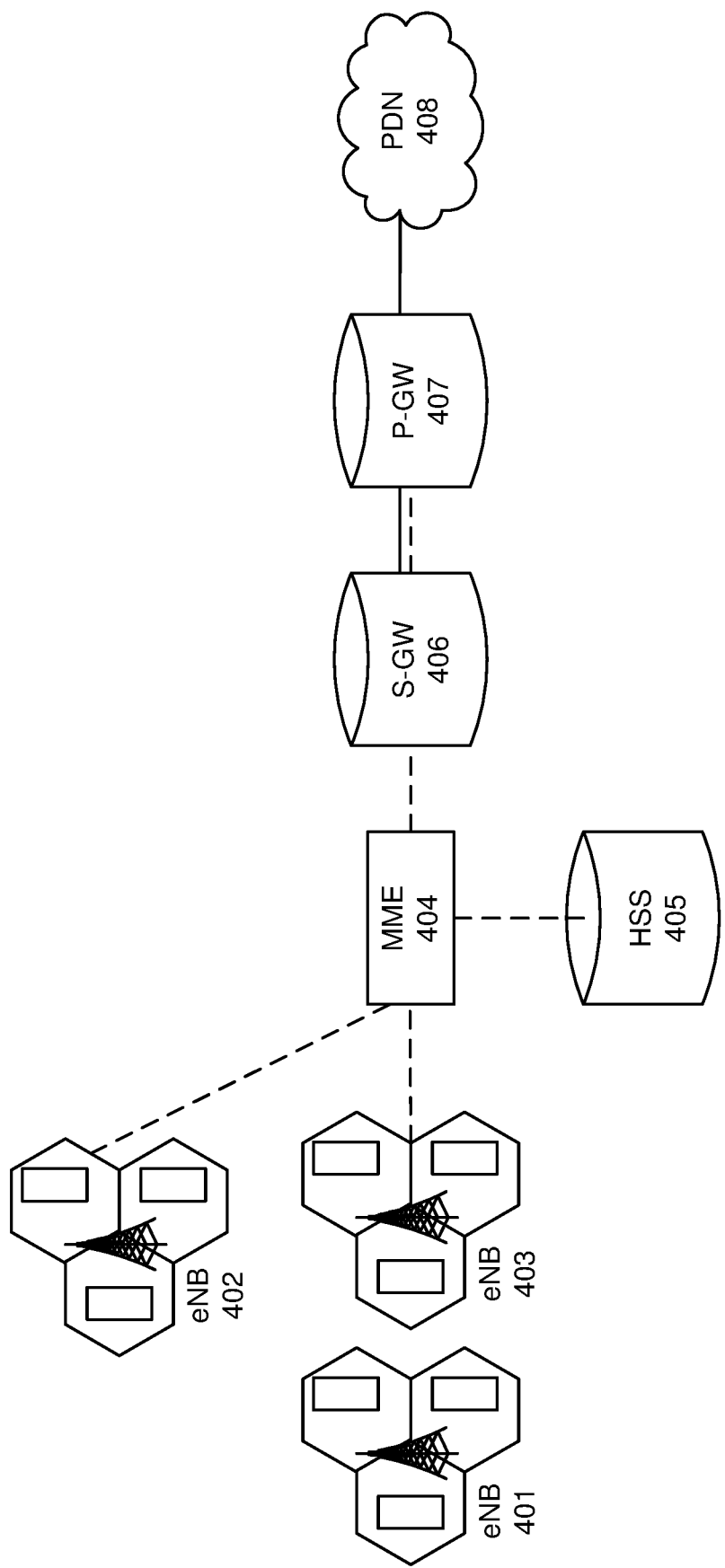
FIG. 4 is a detailed view of an example LTE network architecture, showing communication between various components thereof, in accordance with various aspects and embodiments of the subject disclosure.

FIG. 4 is a detailed view of an example LTE network architecture, showing communication between various components thereof, in accordance with various aspects and embodiments of the subject disclosure. FIG. 4 includes eNodeBs (eNBs) 401, 402, 403, a mobile management entity (MME) 404, a home subscriber server (HSS) 405, a serving gateway (S-GW) 406, a PDN Gateway (P-GW) 407, and a PDN 408.

In FIG. 4, the E-UTRAN introduced in FIG. 3 is implemented via the eNBs 401, 402, 403. An eNB can be located at a given point, or "cell site," and can be assigned a cluster of one or more network cells. An eNB can control the mobile devices located within its cluster. For a UE in a particular cell, the controlling eNB is responsible for radio interface transmission and reception. In addition to this, the eNB is responsible for ensuring secure connectivity between the mobile device and the rest of the network.

The MME 404 is central to other entities within the EPC 303 (see FIG. 3). Each MME 404 manages several eNBs 401, 402, 403, and there are typically two or more MMEs in a network. A single MME can communicate with the mobile devices in its service area through their corresponding eNBs. One of the many responsibilities of the MME is the authentication of the mobile device upon its initial connection to the network. To avoid security threats that may arise when a mobile device makes itself known to the network, the MME assigns each device under its management a unique but temporary identity, or globally unique temporary ID (GUTI). The MME 404 also supports control signaling for handovers of a mobile device between eNBs 401, 402, 403 or other MMEs.

The MME 404 communicates with two other major components: the HSS 405 and the S-GW 406. The HSS 405 contains the user profiles of the mobile devices in the network, and the S-GW 406, much like a router, forwards data between the network and any P-GW 407, which then connects to the PDN 408 if necessary.

For a phantom E911 call to be initiated (for a device to "go rogue"), some malfunction, unexpected issue or error must occur somewhere along a pipeline comprising an eNB 403, the MME 404, the HSS 405, the S-GW 406 and the P-GW 407. The factors contributing to a device "going rogue" may be device related, network related, or both.

Data can be collected from an eNB 403, the MME 404, the HSS 405, the S-GW 406 and the P-GW 407, and data features of interest can include, e.g., international mobile equipment identity (IMEI) and international mobile subscriber identifier (IMSI) data. IMEI is a unique identification or serial number assigned to mobile devices. IMSI is a number of 14-15 digits which uniquely identifies a mobile subscriber by their subscriber identity module (SIM) card. Each data sample can be labelled, e.g., as "phantom—1" if it was collected from a rogue device, or as "role model—0" if it was collected from a normal device. Throughout this disclosure we identify a mobile device that has a tendency to initiate phantom calls (i.e. a rogue device) through its IMEI, and we refer to it as a "phantom IMEI". A non-phantom IMEI can be referred to as a "role model IMEI". Thus, given a dataset of call records with device and network level features, where phantom and role model IMEIs are known, embodiments can build two transductive models that can identify device and network level features strongly correlated with a mobile's ability to go rogue. A challenging aspect of the data under study is its categorical nature, and embodiments can therefore apply pre-processing and encoding techniques before implementing a transductive model.

Embodiments can conduct pre-processing of raw data features after data acquisition, to prepare obtained data for machine learning. Pre-processing can ensure the quality and usefulness of the data and can directly affect the performance of the model. An initial step of pre-processing can involve data-cleaning at the feature and sample level. This can involve carefully filling in missing values, or removing samples with multiple missing values, and discarding features that are deemed unhelpful. Discarding of features can be done sparingly, for example embodiments can rely on the following criteria to systematically determine if a feature should be discarded: 1) A feature has null/missing values across all data samples. 2) A feature is redundant (has only one value across all call records, for both phantom and role model IMEIs). 3) A feature is deemed meaningless/desultory, i.e., it has no effect on the data sample label.

FIG. 5 is a table listing example device level features and network level features, and descriptions thereof, in accordance with various aspects and embodiments of the subject disclosure. The illustrated data features can be drawn from a larger set of features that describe different device and network specific information, such as time stamps, and various identifiers for devices, gateways, nodes and area codes. After anonymizing and cleaning the data based on the criteria described herein, the table in FIG. 5 provides a list and description of a final set of data features for use in connection with some embodiments. Sensitive personal information can be anonymized by removing it from the dataset to maintain customer privacy. The device related features in FIG. 5 include, "IMEI", and "IMSI". The network related features in FIG. 5 include, "MMEGI", "MMEC", "MTMSI", "PLMN_ID", "eNBId", and "CELL_ID".

The illustrated data features are categorical data. The preprocessed data can be encoded. Some example encoding techniques include One Hot Encoding, Binary Encoding and BaseN Encoding. The major limitations of One Hot or Binary encoding are computation complexity and the storage. A BaseN-Encoder may therefore be preferred in some embodiments, and the BaseN-Encoder can encode cleaned data with, e.g., N=10, to enable decimal encoding. Compared to other encoding methods, decimal encoding uses less computational resources, especially when the number of distinct categories for any feature is large, which is indeed the case for the data under study.

After data is prepared, embodiments can use the prepared data to train machine learning processes to identify devices that are likely to initiate phantom calls. Example embodiments can employ either or both of two example machine learning supervised classification processes: K Nearest Neighbors (KNN) and Decision Trees (DT). In an example, two sets of experiments can be performed: (1) a KNN classification model on data with the device level features only (referred to as experiment setup 1); and (2) a DT classification model on data with the network level features only (referred to as experiment setup 2).

Embodiments according to experiment setup 1 can use a KNN model in order to achieve a higher level of accuracy. Auxiliary software can perform a feature importance analysis. Since embodiments can also use DT in experiment setup 2, embodiments are able to perform a feature analysis automatically.

Figure 6:
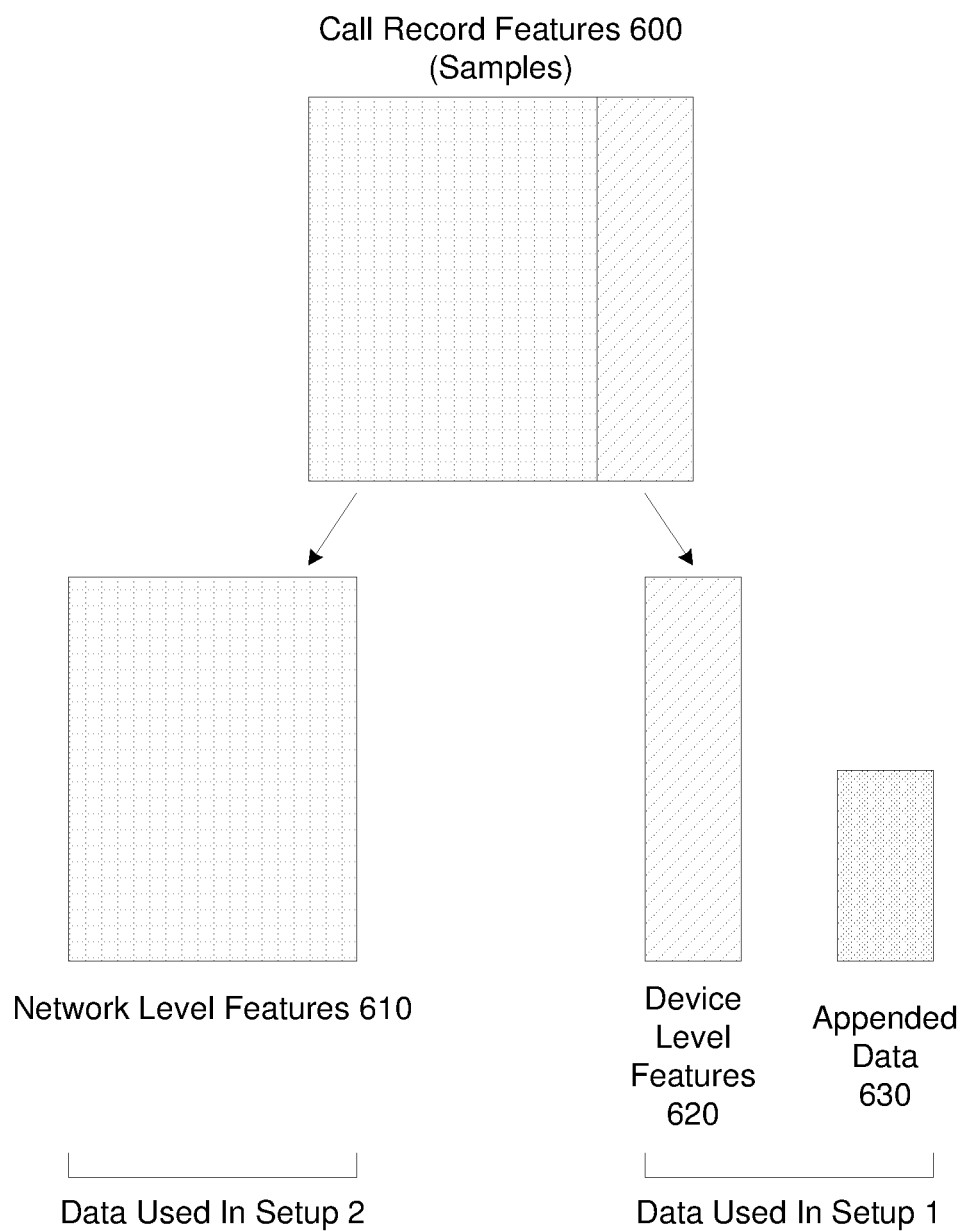
FIG. 6 illustrates example data partitioning to pre-process data in order to use the data to train a machine learning model, in accordance with various aspects and embodiments of the subject disclosure.

FIG. 6 illustrates example data partitioning to pre-process data in order to use the data to train a machine learning model, in accordance with various aspects and embodiments of the subject disclosure. A main dataset for both experimental setups can comprise call record features 600, which can include network and device level features from network call records collected during a predetermined time interval, such as an interval of weeks or months. In an example, the call record features 600 can comprise 7 distinct phantom IMEIs and 25,000 distinct role model IMEIs. Each IMEI produces at least 1, and up to a few thousand samples. Therefore, we are not operating in an under-sampling regime. A sample can be labeled as "phantom–1" if its corresponding IMEI was phantom, and as "role model—0" (or "not phantom") if its corresponding IMEI was not phantom.

Categorical data for device level features (IMEI and IMSI) 620 can be extracted from samples 600 and used in the first experimental setup, whilst categorical data for network level features 610 can be extracted from samples 600 and used in the second experimental setup. In addition, some supplementary device level data samples, referred to as appended data 630, can be appended with the device level features 620 for setup 1.

FIG. 7 illustrates example globally unique temporary identifier (GUTI) data, wherein sub-parts of the GUTI data can optionally be separately considered during machine learning model training, in accordance with various aspects and embodiments of the subject disclosure. The example GUTI 700 comprises a PLMN-ID 701 of 20-24 bits, an MMEGI 702 of 16 bits, an MMEC 703 of 8 bits, and an MTMSI 704 of 32 bits. Many of the network level features shown in FIG. 5 are in fact elements composing the GUTI 700.

By considering the sub-parts of a GUTI 700 individually, embodiments can increase the richness and interpretability of the data under study. With this motivation in mind, feature engineering can be performed on both the network level features and the device level features.

FIG. 8 illustrates example international mobile equipment identity (IMEI) data, wherein sub-parts of the IMEI data can optionally be separately considered during machine learning model training, in accordance with various aspects and embodiments of the subject disclosure. The example IMEI 800 comprises a Type Allocation Code (TAC) Body Identifier 801 of two digits, a TAC Type Identifier 802 of six digits, a serial number 803 of six digits, and a check digit 804 of one digit. A TAC is used to uniquely identify a mobile device in an LTE network and is composed of the body identifier 801 and the type identifier 802, which indicate the device's brand owner and model type. The serial number 803 is a unique number assigned to the device by the manufacturer.

FIG. 9 illustrates example international mobile subscriber identity (IMSI) data, wherein sub-parts of the IMSI data can optionally be separately considered during machine learning model training, in accordance with various aspects and embodiments of the subject disclosure. The example IMSI 900 comprises a mobile country code (MCC) 901 of two digits, a mobile network code (MNC) 902 of 2-3 digits, and a mobile subscriber identification number (MSIN) 903 of up to ten digits. Similar to splitting the IMEI 800 into sub-parts, embodiments can split the IMSI 900 into the various sub-parts 901, 902, and 903, which are all identifiers stored on a SIM card in a device.

When studying device level features, rather than considering IMEI and IMSI alone, embodiments can opt to consider the 6 features that compose IMEI and IMSI (i.e. TAC Body, TAC Type, Serial Number, MCC, MNC, MSIN). In experiment setup 1, the chosen features can comprise features of the IMEI and IMSI of interest and can be those that are strongly correlated with a device's ability to initiate phantom E911 calls.

Appending supplementary device level data, such as appended data 630, can apply a balancing technique done in order to achieve comparability between the number of phantom and role model data samples respectively. For training the KNN model, embodiments can apply a 67/33 split ratio. The distinct device features (i.e. the 6 components of IMEI and IMSI rather than IMEI and IMSI alone) can be used, and data can be sampled in a way such that there is no overlap in IMEI (phantom and role model) between training and validation data sets. A training stage can include hyper parameter tuning in order to get the best number of neighbors K. In order to test the generalizability of the fitted model (and evaluate the model with changes in real networks), the model can also be tested against a selection of extracted call records. In addition to fitting the KNN model, embodiments can be used to identify the contributions that the device level features have on the model. An inference tool, e.g., Lime or another such inference tool, can be applied to understand the data features that impact the accuracy.

In experiment setup 2, embodiments can diagnose network related features that may be correlated to a device's ability to initiate phantom E911 calls or features that may aid in further understanding some of the properties of phantom devices. Embodiments can use a DT model to analyze feature importance. Example data utilized in experiment setup 2 can contain, e.g., call records from phantom IMEIs. Embodiments can perform cross validation, e.g., 6-fold cross validation, where in each validation iteration (also called a trial) call records from an IMEI can be used as test data. To ensure a balanced dataset in each iteration, embodiments can sample role model call records uniformly at random, while also ensuring no overlap in IMEIs between training and testing.

In both experimental setups, two accuracy scores can be considered: "recall" and "specificity". "True Positive" and "False Positive" are denoted herein as TP and FP, respectively, while "true negative" and "false negative" are denoted herein as TN and FN, respectively. Recall is defined herein as (TP/(TP+TN)), representing the model's ability to accurately label phantom call records. Specificity defined herein as (TN/(TN+FP)) representing the model's ability to accurately label role model call records. Embodiments can separate these two scores to detect phantom call records specifically. In contrast, average classification accuracy may not reflect the model's ability to do so.

In experiment setup 1, training/validation of a KNN model can potentially achieve an overall accuracy of up to 94%. In some embodiments, a testing dataset is not used in the training/validation process, allowing the test data to evaluate the generalizability of the KNN model. An example model can predict, e.g., up to 80% of phantom call records, and up to 94% of normal records, thereby achieving a high confidence in the model's predictive ability. Some of the most impactful data features can include TAC Type and MNC. These results can be used by customer care teams to focus on a narrowed list of possible devices that have a potential to go rogue (for example, 25% of devices may be tagged as rogue compared to millions of active devices in a network). Embodiments can support proactive action on the identified devices, perhaps even before any phantom call is initiated.

In experiment setup 2, feature importance analysis of the DT shows that a feature, e.g., MTMSI, can be most correlated with a phantom call record, and can occupy 98% of the decisive power or more. MTMSI is associated with MME group which in turn helps to recognize the geographic location involved in a phantom call. Identifying the MTMSI and MME associated to the phantom call can be very useful if a cluster of devices are involved in phantom calls. Such a cluster of MTMSIs can be easily identified through the DT itself.

Based on these results, two conclusions can be made. First, the device specific machine learning model helps in the real networks to predict the devices that have the potential to go rogue (namely IMEI and IMSI, but more specifically, TAC Body Type and MNC). Such predictions can directly help a network carrier's customer care teams to focus on helping customers with such devices. If they are "bring your own device" (BYOD), then such devices can for example be suggested for discounted upgrades to solve the software issues related to features highly correlated with phantom devices. Applying these steps at an early stage saves network resources and reduces the volume of phantom E911 calls. Secondly, the network specific machine learning model helps in detecting clusters of devices that are behaving in rogue (through their MTMSIs), so customer care teams can identify the behavior and place appropriate measures to handle them automatically. This saves troubleshooting time for customer care personnel and network engineers, rather than having to manually figure out the pattern in such cluster of rogue devices.

According to some embodiments, two diagnostic models for device and network related features can be implemented, using supervised ML processes: KNN and DT. Features can be identified that are strongly correlated with a device's ability to initiate phantom E911 calls. The device ML model can be generalizable and can work with unseen data. Embodiments can also use the network feature "MTMSI" to identify rogue devices, due it the importance of MTMSI in triggering phantom E911 calls. Suggestions can be provided to network operators that may help reduce the large volume and provide early prevention of phantom E911 calls.

Figure 10:
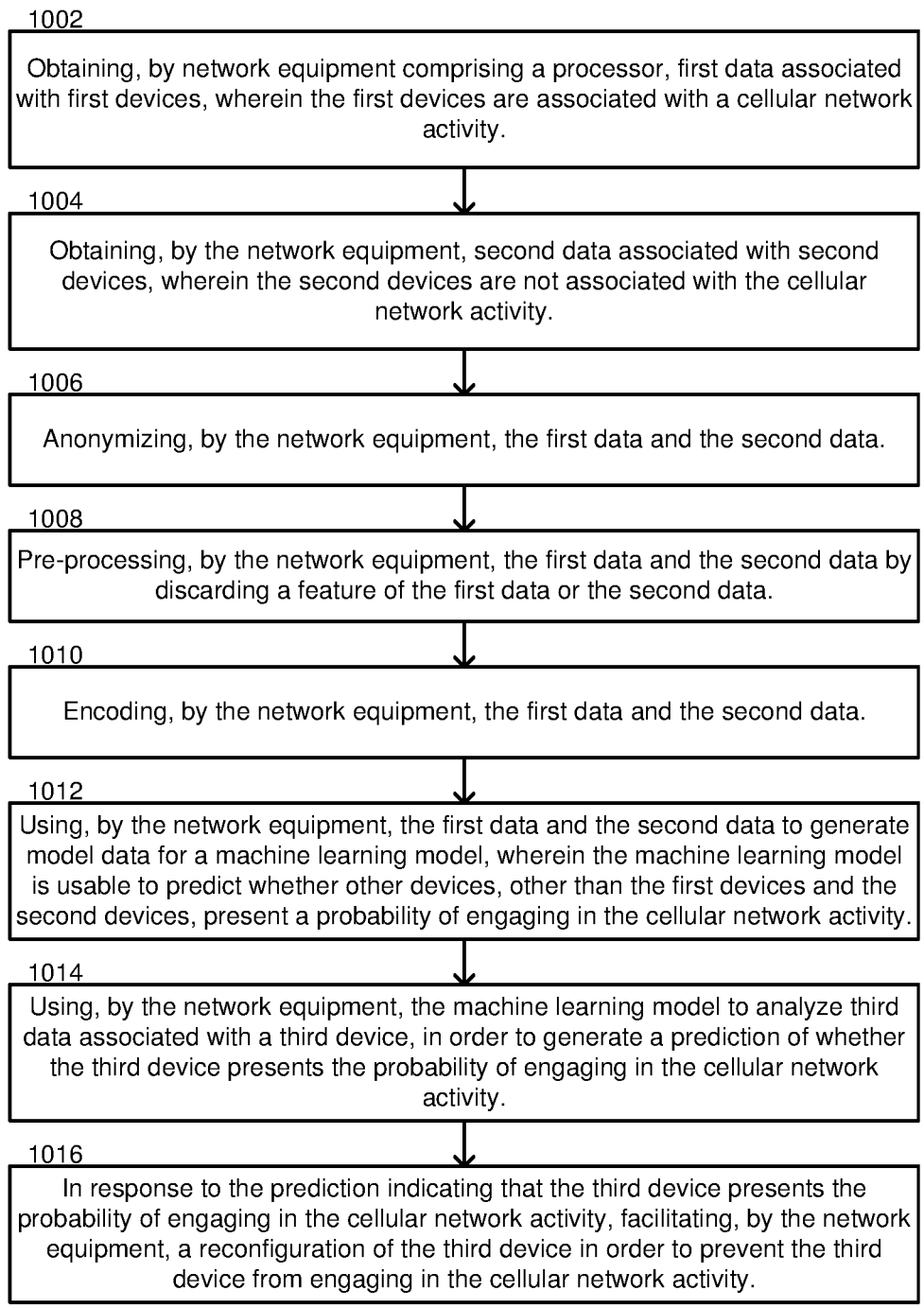
FIG. 10 is a flow diagram representing example operations of network equipment to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure.

FIG. 10 is a flow diagram representing example operations of network equipment to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by network equipment, e.g., network equipment within communication service provider network(s) 106, illustrated in FIG. 1. Example operation 1002 comprises obtaining, by network equipment comprising a processor, first data associated with first devices, wherein the first devices are associated with a cellular network activity. The cellular network activity can comprise, e.g., phantom emergency service communications such as phantom E911 calls. The first data can comprise, e.g., call detail records associated with calls made by first devices such as UE $102_1$. The call detail records can include, or can be supplemented to include, IMEI data, IMSI data and/or any of the other data described herein, such as the data described in connection with FIGS. 5-9.

Example operation 1004 comprises obtaining, by the network equipment, second data associated with second devices, wherein the second devices are not associated with the cellular network activity. The second data can comprise, e.g. call detail records associated with calls made by first devices such as UE $102_2$. Similar to the first data, the call detail records obtained as second data can include, or can be supplemented to include, IMEI data, IMSI data and/or any of the other data described herein, such as the data described in connection with FIGS. 5-9.

Example operations 1006, 1008, and 1010 are directed to preparing the data obtained at operations 1002 and 1004, so that the obtained data can be used to train machine learning models. Example operation 1006 comprises anonymizing, by the network equipment, the first data and the second data, e.g., by removing personal information that could be used to identify the owners of the UEs 102. Example operation 1008 comprises pre-processing, by the network equipment, the first data and the second data by discarding a feature of the first data or the second data. For example, redundant data that is unhelpful for machine learning can be discarded. Example operation 1008 can also comprise modifying or "cleaning" the obtained data. Example operation 1010 comprises encoding, by the network equipment, the first data and the second data. For example, BaseN encoding or other encoding techniques can be used to encode the first data and the second data.

Example operation 1012 comprises using, by the network equipment, the first data and the second data to generate model data for a machine learning model, wherein the machine learning model is usable to predict whether other devices, other than the first devices and the second devices, present a probability of engaging in the cellular network activity. The machine learning model can comprise, e.g., a KNN machine learning model and/or a DT machine learning model, as described herein. Machine learning models can be trained to predict whether other devices such as another UE $102_3$ present a probability of engaging in the cellular network activity (here, the phantom calls). Any of the various data features disclosed herein can be useful for training machine learning models. For example, in some embodiments, using the first data and the second data to generate the model data for the machine learning model can comprise, e.g., using TAC type identifiers included in the first IMEI data (of the first devices) and the second IMEI data (of the first devices).

After a machine learning model is trained according to operation 1012, the machine learning model can be used at example operation 1014. Example operation 1014 comprises using, by the network equipment, the machine learning model to analyze third data associated with a third device, in order to generate a prediction of whether the third device presents the probability of engaging in the cellular network activity. The third data can comprise, e.g. call detail records associated with calls made by third devices such as UE $102_3$. Similar to the first and second data, the call detail records obtained as third data can include, or can be supplemented to include, IMEI data, IMSI data and/or any of the other data described herein, such as the data described in connection with FIGS. 5-9. The third data can be also be prepared similarly to preparation of the first and second data, according to operations 1006, 1008, and 1010. The trained machine learning model can predict, based on the third data, whether the UE $102_3$ presents the probability of engaging in phantom calls.

Example operation 1016 comprises in response to the prediction (generated at operation 1014) indicating that the third device presents the probability of engaging in the cellular network activity, facilitating, by the network equipment, a reconfiguration of the third device in order to prevent the third device from engaging in the cellular network activity. For example, the communication service provider network(s) 106 can initiate a reconfiguration of a UE $102_3$ to prevent the UE $102_3$ from making phantom calls.

Figure 11:
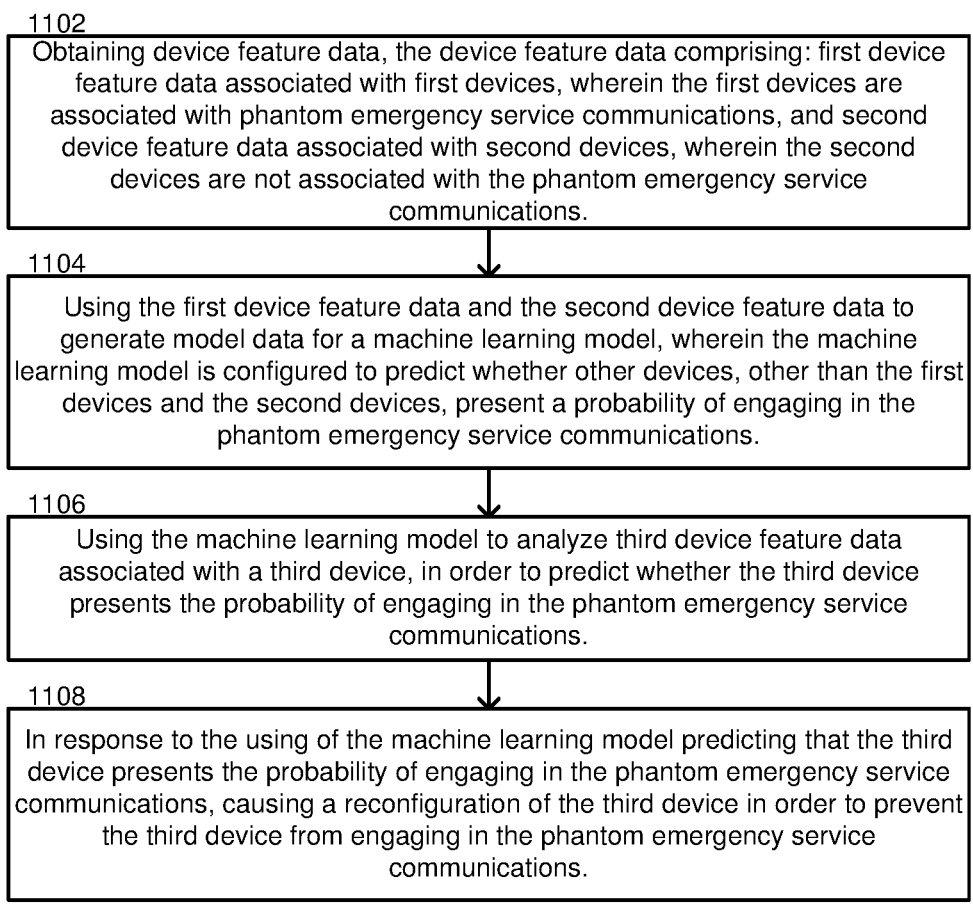
FIG. 11 is a flow diagram representing example operations of network equipment to use device feature data to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure.

FIG. 11 is a flow diagram representing example operations of network equipment to use device feature data to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 11 can be performed, for example, by network equipment, e.g., network equipment within communication service provider network(s) 106, illustrated in FIG. 1. Example operation 1102 comprises obtaining device feature data, the device feature data comprising: first device feature data associated with first devices, wherein the first devices are associated with phantom emergency service communications, and second device feature data associated with second devices, wherein the second devices are not associated with the phantom emergency service communications. The first and second device feature data can comprise any of the device feature data described herein, e.g., first and second IMEI data associated with the first and second devices, e.g., UEs such as UE $102_1$ and UE $102_2$ respectively. The first and second IMEI data can comprise data such as illustrated in FIG. 8, e.g., first and second TAC type identifiers.

Furthermore, the obtained device feature data can comprise a split ratio that defines a ratio of the first device feature data to the second device feature data. The split ratio, represented as percentage, can be selected to be, e.g., 33%/67%, 20%/80%, or 10%/90%. In an example 33%/67% split ratio, 33% of the device feature data is first device feature data (associated with phantom emergency service communications) and 67% of the device feature data is second device feature data (not associated with phantom emergency service communications).

Example operation 1104 comprises using the first device feature data and the second device feature data to generate model data for a machine learning model, wherein the machine learning model is configured to predict whether other devices, other than the first devices and the second devices, present a probability of engaging in the phantom emergency service communications. The machine learning model can comprise, e.g., a KNN machine learning model described herein. The KNN machine learning model can be trained using the first device feature data (associated with phantom emergency service communications) and the second device feature data (not associated with phantom emergency service communications), so that the KNN machine learning model can learn to predict whether or not other devices, e.g., UE $102_3$, are likely to engage in phantom emergency service communications.

Example operation 1106 comprises using the machine learning model to analyze third device feature data associated with a third device, e.g., call detail records associated with UE $102_3$, in order to predict whether the third device $102_3$ presents the probability of engaging in the phantom emergency service communications. Example operation 1108 comprises, in response to the using of the machine learning model (at operation 1106) predicting that the third device $102_3$ presents the probability of engaging in the phantom emergency service communications, causing a reconfiguration of the third device $102_3$ in order to prevent the third device $102_3$ from engaging in the phantom emergency service communications.

Figure 12:
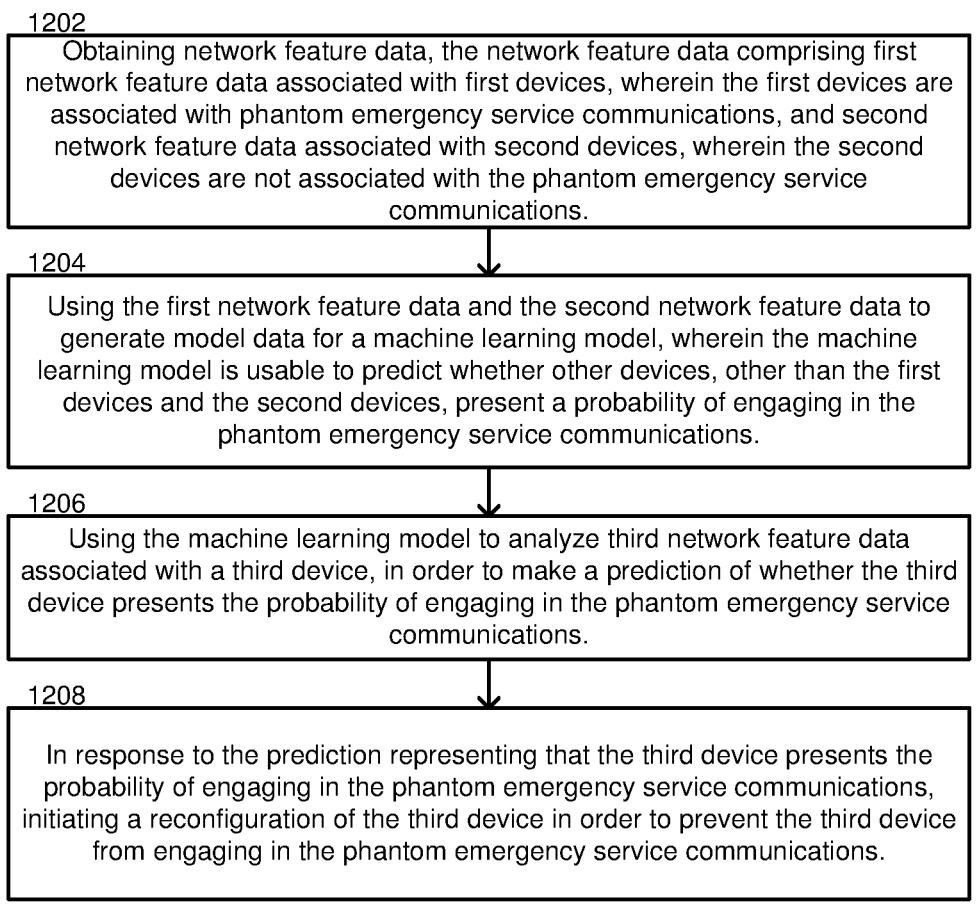
FIG. 12 is a flow diagram representing example operations of network equipment to use network feature data to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure.

FIG. 12 is a flow diagram representing example operations of network equipment to use network feature data to train a machine learning model to identify devices likely to engage in a cellular network activity, deploy the trained machine learning model to identify devices, and reconfigure identified devices to prevent them from engaging in the network activity, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 12 can be performed, for example, by network equipment, e.g., network equipment within communication service provider network(s) 106, illustrated in FIG. 1. Example operation 1202 comprises obtaining network feature data, the network feature data comprising first network feature data associated with first devices, wherein the first devices are associated with phantom emergency service communications, and second network feature data associated with second devices, wherein the second devices are not associated with the phantom emergency service communications.

For example, first call detail records can be obtained for calls made by UEs such as UE $102_1$, wherein the UE $102_1$ is associated with phantom emergency service communications, and second call detail records can be obtained for calls made by UEs such as UE $102_2$, wherein the UE $102_2$ is not associated with phantom emergency service communications. The first and second network feature data can be extracted from the first and second call detail records. The first and second network feature data can optionally comprise any subset of the network feature data described herein. For example, the first and second network feature data can optionally comprise first and second MTMSI data associated with the first and second devices, respectively.

Example operation 1204 comprises using the first network feature data and the second network feature data to generate model data for a machine learning model, wherein the machine learning model is usable to predict whether other devices, other than the first devices and the second devices, present a probability of engaging in the phantom emergency service communications. The machine learning model can comprise, e.g., a DT machine learning model as described herein. The DT machine learning model can be trained using the first network feature data and the second network feature data, so that the trained DT machine learning model can predict whether other devices, e.g., UEs such as UE $102_3$, may engage in the phantom emergency service communications.

Example operation 1206 comprises using the machine learning model to analyze third network feature data associated with a third device, e.g., call detail records of calls made by UE $102_3$, in order to make a prediction of whether the third device $102_3$ presents the probability of engaging in the phantom emergency service communications. In some embodiments, the third device $102_3$ may be included in a group of devices, wherein the group of devices presents the probability of engaging in the phantom emergency service communications. The group of devices can comprise, e.g., a geographically clustered group of devices such as a group of devices connected to a single cell or sector.

Example operation 1208 comprises, in response to the prediction (at operation 1206) representing that the third device $102_3$ presents the probability of engaging in the phantom emergency service communications, initiating a reconfiguration of the third device $102_3$ in order to prevent the third device $102_3$ from engaging in the phantom emergency service communications.

Figure 13:
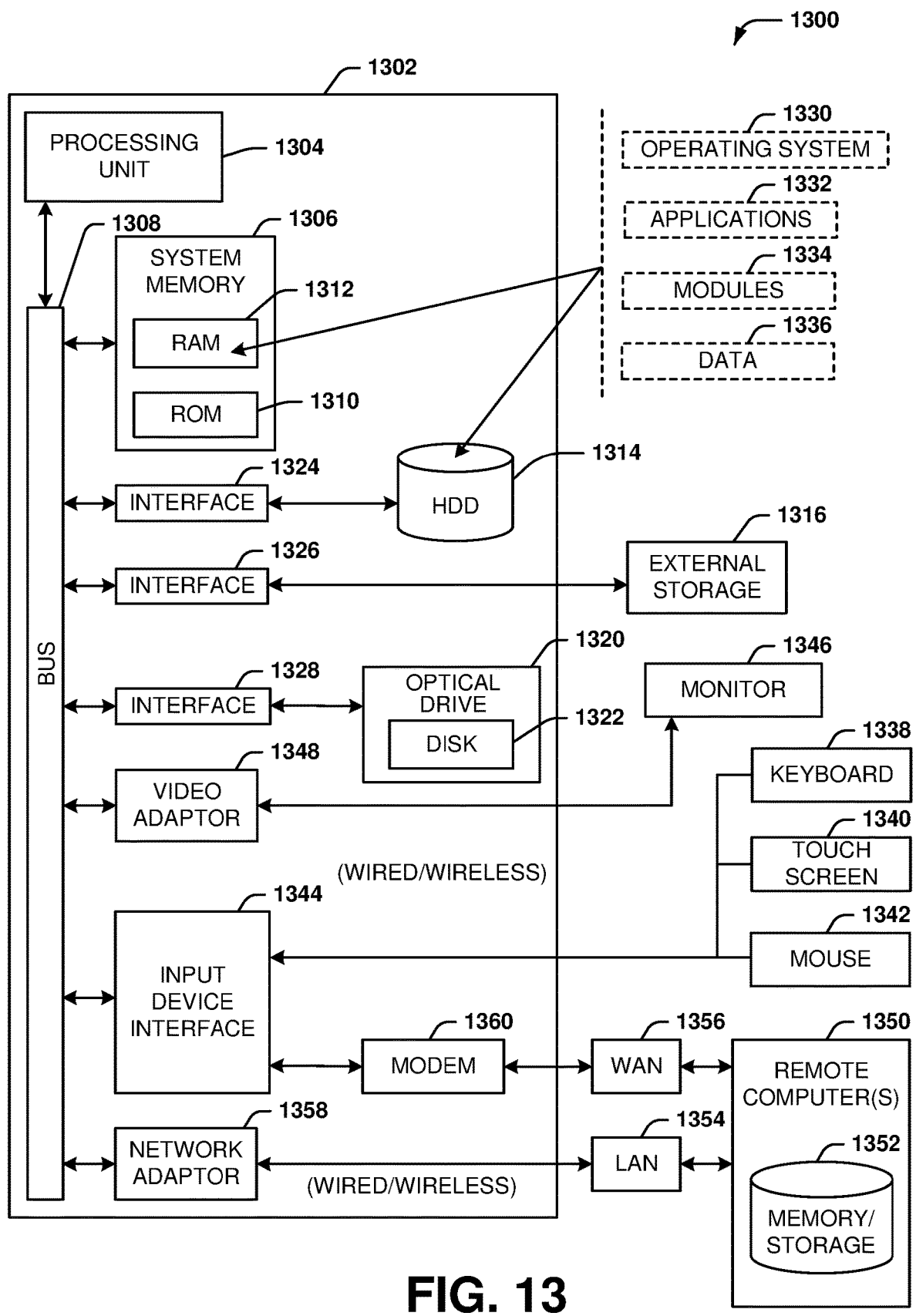
FIG. 13 is a block diagram of an example computer that can be operable to execute processes and methods in accordance with various aspects and embodiments of the subject disclosure.

FIG. 13 is a block diagram of an example computer that can be operable to execute processes and methods in accordance with various aspects and embodiments of the subject disclosure. The example computer can be adapted to implement, for example, any of the various network equipment described herein.

FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    obtaining, by network equipment comprising a processor, first data associated with first devices, wherein the first devices are associated with a cellular network activity;
    obtaining, by the network equipment, second data associated with second devices, wherein the second devices are not associated with the cellular network activity;
    using, by the network equipment, the first data and the second data to generate model data for a machine learning model, wherein the machine learning model is usable to predict whether other devices, other than the first devices and the second devices, present a probability of engaging in the cellular network activity;
    using, by the network equipment, the machine learning model to analyze third data associated with a third device, in order to generate a prediction of whether the third device presents the probability of engaging in the cellular network activity; and
    in response to the prediction indicating that the third device presents the probability of engaging in the cellular network activity, facilitating, by the network equipment, a reconfiguration of the third device in order to prevent the third device from engaging in the cellular network activity.

2. The method of claim 1, wherein the cellular network activity comprises a phantom emergency service communication.

3. The method of claim 1, further comprising:
    anonymizing, by the network equipment, the first data and the second data;

pre-processing, by the network equipment, the first data and the second data by discarding a feature of the first data or the second data; and encoding, by the network equipment, the first data and the second data.

4. The method of claim 3, wherein BaseN encoding is used to encode the first data and the second data.

5. The method of claim 1, wherein the first data comprises first international mobile equipment identity data associated with the first devices, and wherein the second data comprises second international mobile equipment identity data associated with the second devices.

6. The method of claim 5, wherein using the first data and the second data to generate the model data for the machine learning model comprises using type allocation code type identifiers included in the first international mobile equipment identity data and the second international mobile equipment identity data.

7. The method of claim 1, wherein the first data comprises first international mobile subscriber identity data associated with the first devices, and wherein the second data comprises second international mobile subscriber identity data associated with the second devices.

8. The method of claim 1, wherein the first data comprises first mobility management entity mobile subscriber identity data associated with the first devices, and wherein the second data comprises second mobility management entity mobile subscriber identity data associated with the second devices.

9. The method of claim 1, wherein the machine learning model comprises a k nearest neighbors machine learning model.

10. The method of claim 1, wherein the machine learning model comprises a decision tree machine learning model.

11. Network equipment, comprising:
a processor; and
a memory that stores executable instructions that, when executed by the processor, facilitate performance of operations, comprising:
obtaining device feature data, the device feature data comprising:
first device feature data associated with first devices, wherein the first devices are associated with phantom emergency service communications, and
second device feature data associated with second devices, wherein the second devices are not associated with the phantom emergency service communications;
using the first device feature data and the second device feature data to generate model data for a machine learning model, wherein the machine learning model is configured to predict whether other devices, other than the first devices and the second devices, present a probability of engaging in the phantom emergency service communications;
using the machine learning model to analyze third device feature data associated with a third device, in order to predict whether the third device presents the probability of engaging in the phantom emergency service communications; and
in response to the using of the machine learning model predicting that the third device presents the probability of engaging in the phantom emergency service communications, causing a reconfiguration of the third device in order to prevent the third device from engaging in the phantom emergency service communications.

12. The network equipment of claim 11, wherein the first device feature data comprises first international mobile equipment identity data associated with the first devices, and wherein the second device feature data comprises second international mobile equipment identity data associated with the second devices.

13. The network equipment of claim 12, wherein the first international mobile equipment identity data comprises first type allocation code type identifiers and the second international mobile equipment identity data comprises second type allocation code type identifiers.

14. The network equipment of claim 11, wherein the machine learning model comprises a k nearest neighbors machine learning model.

15. The network equipment of claim 11, wherein the device feature data comprises a split ratio between the first device feature data and the second device feature data, and wherein the split ratio, represented as percentage, is selected to be 33%/67%, 20%/80%, or 10%/90%.

16. A non-transitory machine-readable medium, comprising executable instructions that, when executed by a processor, facilitate performance of operations, comprising:
obtaining network feature data, the network feature data comprising first network feature data associated with first devices, wherein the first devices are associated with phantom emergency service communications, and second network feature data associated with second devices, wherein the second devices are not associated with the phantom emergency service communications;
using the first network feature data and the second network feature data to generate model data for a machine learning model, wherein the machine learning model is usable to predict whether other devices, other than the first devices and the second devices, present a probability of engaging in the phantom emergency service communications;
using the machine learning model to analyze third network feature data associated with a third device, in order to make a prediction of whether the third device presents the probability of engaging in the phantom emergency service communications; and
in response to the prediction representing that the third device presents the probability of engaging in the phantom emergency service communications, initiating a reconfiguration of the third device in order to prevent the third device from engaging in the phantom emergency service communications.

17. The non-transitory machine-readable medium of claim 16, wherein the first network feature data comprises first mobility management entity mobile subscriber identity data associated with the first devices, and wherein the second device feature data comprises second mobility management entity mobile subscriber identity data associated with the second devices.

18. The non-transitory machine-readable medium of claim 16, wherein the third device is included in a group of devices, and wherein the group of devices presents the probability of engaging in the phantom emergency service communications.

19. The non-transitory machine-readable medium of claim 18, wherein the group of devices comprises a geographically clustered group of devices.

20. The non-transitory machine-readable medium of claim 16, wherein the machine learning model comprises a decision tree machine learning model.

* * * * *